(12) United States Patent
Rezaei

(10) Patent No.: US 11,327,181 B2
(45) Date of Patent: May 10, 2022

(54) METHOD AND APPARATUS FOR ACCURATE REPORTING OF INTEGRITY OF GNSS-BASED POSITIONING SYSTEM

(71) Applicant: Valeo Comfort and Driving Assistance, Creteil (FR)

(72) Inventor: Shahram Rezaei, Danville, CA (US)

(73) Assignee: Valeo Comfort and Driving Assistance, Creteil (FR)

( * ) Notice: Subject to any disclaimer, the term of this patent is extended or adjusted under 35 U.S.C. 154(b) by 345 days.

(21) Appl. No.: 16/654,852

(22) Filed: Oct. 16, 2019

(65) Prior Publication Data
US 2021/0116579 A1    Apr. 22, 2021

(51) Int. Cl.
| | | |
|---|---|---|
| *G01S 19/20* | (2010.01) |
| *G01S 19/39* | (2010.01) |
| *G01S 19/47* | (2010.01) |
| *G01S 19/25* | (2010.01) |

(52) U.S. Cl.
CPC ............ *G01S 19/20* (2013.01); *G01S 19/25* (2013.01); *G01S 19/393* (2019.08); *G01S 19/47* (2013.01)

(58) Field of Classification Search
CPC ......... G01S 19/20; G01S 19/393; G01S 19/25
USPC .................................... 342/357.58, 387, 458
See application file for complete search history.

(56) References Cited

U.S. PATENT DOCUMENTS

| | | | | |
|---|---|---|---|---|
| 2012/0290146 | A1* | 11/2012 | Dedes ............... | G01C 21/3697 701/1 |
| 2018/0045832 | A1* | 2/2018 | Ibrahim ................. | G08G 1/08 |

OTHER PUBLICATIONS

Kannemans H., "The Generalized Extreme Value Statistical Method to Determine the GNSS Integrity Performance," National Aerospace Laboratory NLR, Report No. NLR-TP-2010-491, Dec. 2010, 14 Pages.

* cited by examiner

*Primary Examiner* — Bo Fan
(74) *Attorney, Agent, or Firm* — Weaver Austin Villeneuve & Sampson LLP

(57) ABSTRACT

A method includes obtaining position information of a first vehicle collected in real time by a first positioning system during a first trip on a route, post-processing the collected position information to determine corrected position data of the first vehicle during the first trip, computing position errors of the first positioning system at a plurality of locations during the first trip, determining integrity performance of the first positioning system at the plurality of locations, and providing the integrity performance of the first positioning system at the plurality of locations to the first vehicle or a second vehicle for determining real-time integrity performance of the first positioning system on the first vehicle or a second positioning system on the second vehicle at the plurality of locations.

20 Claims, 7 Drawing Sheets

METHOD AND APPARATUS FOR ACCURATE REPORTING OF INTEGRITY OF GNSS-BASED POSITIONING SYSTEM

BACKGROUND

A self-driving vehicle (also referred to as an autonomous vehicle or a driverless car) is capable of sensing its environment and navigating with little to no human input. Autonomous driving technology may offer many benefits, such as reducing transportation cost, reducing the needs for parking space, and the like. An autonomous vehicle system may include these major subsystems: 1) Localization, 2) Perception, 3) Path planning, and 4) Control. Global Navigation Satellite System (GNSS)-based positioning enables and complements vehicle's localization system. While estimated positions from today's GNSS receivers may generally be sufficiently accurate for road level navigation, it is often challenging to estimate positions that are sufficiently accurate and reliable at all time for automated driving.

SUMMARY

Aspects of the present disclosure relate generally to Global Navigation Satellite System (GNSS) based positioning. More specifically and without limitation, disclosed herein are techniques for more accurately determining system integrity information of a GNSS-based positioning system in real time, such that drivers or automated control systems can more confidently rely on the integrity information and/or the position information, for example, for automated driving. Various inventive embodiments are described herein, including devices, systems, modules, methods, software, computer-readable media, and the like.

In certain embodiments, a computer-implemented method may include obtaining position information of a first vehicle determined by a first positioning system on the first vehicle and collected in real time during a first trip on a route, where the collected position information may include estimated positions of the first vehicle and corresponding estimated position errors at a plurality of locations on the route. The method may also include receiving position correction data associated with the route, post-processing the collected position information based on the position correction data to determine corrected position data of the first vehicle during the first trip, computing corrected position errors of the first positioning system at the plurality of locations during the first trip based on the estimated positions of the first vehicle and the corrected position data, and determining integrity performance of the first positioning system at the plurality of locations based on the corrected position errors and the estimated position errors. The method may further include providing the integrity performance of the first positioning system at the plurality of locations to the first vehicle or a second vehicle for determining, in real time and during a second trip on the route, real-time integrity performance of the first positioning system on the first vehicle or a second positioning system on the second vehicle at the plurality of locations.

In some embodiments of the computer-implemented method, the position correction data may include at least one of differential Global Navigation Satellite System (GNSS) correction data, Real Time Kinematic (RTK) correction data, Satellite Based Augmentation System (SBAS) correction data, or Precise Point Positioning (PPP) correction data. In some embodiments, the integrity performance may include at least one of a protection level, an alert limit, integrity risk, or time to alert. In some embodiments, determining the integrity performance of the first positioning system at the plurality of locations on the route may include determining the integrity performance using a generalized extreme value statistical technique.

In some embodiments, the computer-implemented method may also include generating an integrity map that includes the integrity performance for at least the plurality of locations on the route based at least in part on the integrity performance of the first positioning system at the plurality of locations on the route, and providing the integrity map to the first vehicle or the second vehicle. In some embodiments, the computer-implemented method may further include reporting, by the first positioning system or the second positioning system and based on the integrity map, at least one of unavailability of the first positioning system or the second positioning system, a misleading information event, a hazardous misleading information event, or an alert event.

In some embodiments, the first positioning system may include a GNSS receiver. In some embodiments, the first positioning system may also include an inertial measurement unit (IMU), and a sensor fusion module for determining the collected position information based on outputs of the IMU and the GNSS receiver. In some embodiments, the first positioning system may include a Kalman filter configured to determines the estimated positions of the first vehicle and the corresponding estimated position errors.

According to certain embodiments, a positioning system for a vehicle may include a GNSS antenna configured to receive GNSS signals from GNSS satellites, one or more processors, and one or more computer-readable storage media storing instructions. The instructions, when executed by the one or more processors, may cause the one or more processors to receive the GNSS signals from the GNSS antenna, receive a GNSS integrity map that includes integrity performance of one or more GNSS-based positioning systems at a plurality of geographical locations, determine real-time integrity performance of the positioning system during a trip based on the GNSS signals and the GNSS integrity map, and report the real-time integrity performance of the positioning system. The integrity performance may include at least one of a protection level, an alert limit, integrity risk, or time to alert. In some embodiments, the positioning system may further include an IMU, where the instructions, when executed by the one or more processors, may further cause the one or more processors to implement a sensor fusion module that determines positions of the vehicle based on outputs of the IMU and the GNSS signals.

In some embodiments, reporting the real-time integrity performance of the positioning system may include reporting at least one of unavailability of the positioning system, a misleading information event, a hazardous misleading information event, or an alert event. In some embodiments, determining the real-time integrity performance of the positioning system may include determining estimated positions of the vehicle and corresponding estimated position errors using a Kalman filter. In some embodiments, the instructions, when executed by the one or more processors, may cause the one or more processors to receive position correction data including at least one of differential GNSS correction data, RTK correction data, SBAS correction data, or PPP correction data, and to correct the estimated positions of the vehicle based on the position correction data.

According to certain embodiments, a computer-readable storage medium may store instructions that can be executed by one or more processors of a computer system. The instructions may cause the one or more processors to obtain position information of a first vehicle determined by a first positioning system on the first vehicle and collected in real time during a first trip on a route, where the collected position information may include estimated positions of the first vehicle and corresponding estimated position errors at a plurality of locations on the route. The instructions may also cause the one or more processors to receive position correction data associated with the route, post-process the collected position information to determine corrected position data of the first vehicle during the first trip based on the position correction data, compute corrected position errors of the first positioning system at the plurality of locations during the first trip based on the estimated positions of the first vehicle and the corrected position data, and determine integrity performance of the first positioning system at the plurality of locations based on the corrected position errors and the estimated position errors. The instructions may further cause the one or more processors to provide the integrity performance of the first positioning system at the plurality of locations to the first vehicle or a second vehicle for determining real-time integrity performance of the first positioning system on the first vehicle or a second positioning system on the second vehicle at the plurality of locations during a second trip on the route. In some embodiments, determining the integrity performance of the first positioning system at the plurality of locations on the route may include determining the integrity performance using a generalized extreme value statistical technique.

In some embodiments, the instructions may further cause the one or more processors to generate an integrity map that includes the integrity performance for at least the plurality of locations on the route based at least in part on the integrity performance of the first positioning system at the plurality of locations on the route, and provide the integrity map to the first vehicle or the second vehicle. The position correction data may include at least one of differential GNSS correction data, RTK correction data, SBAS correction data, or PPP correction data. The integrity performance may include at least one of a protection level, an alert limit, integrity risk, or time to alert.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
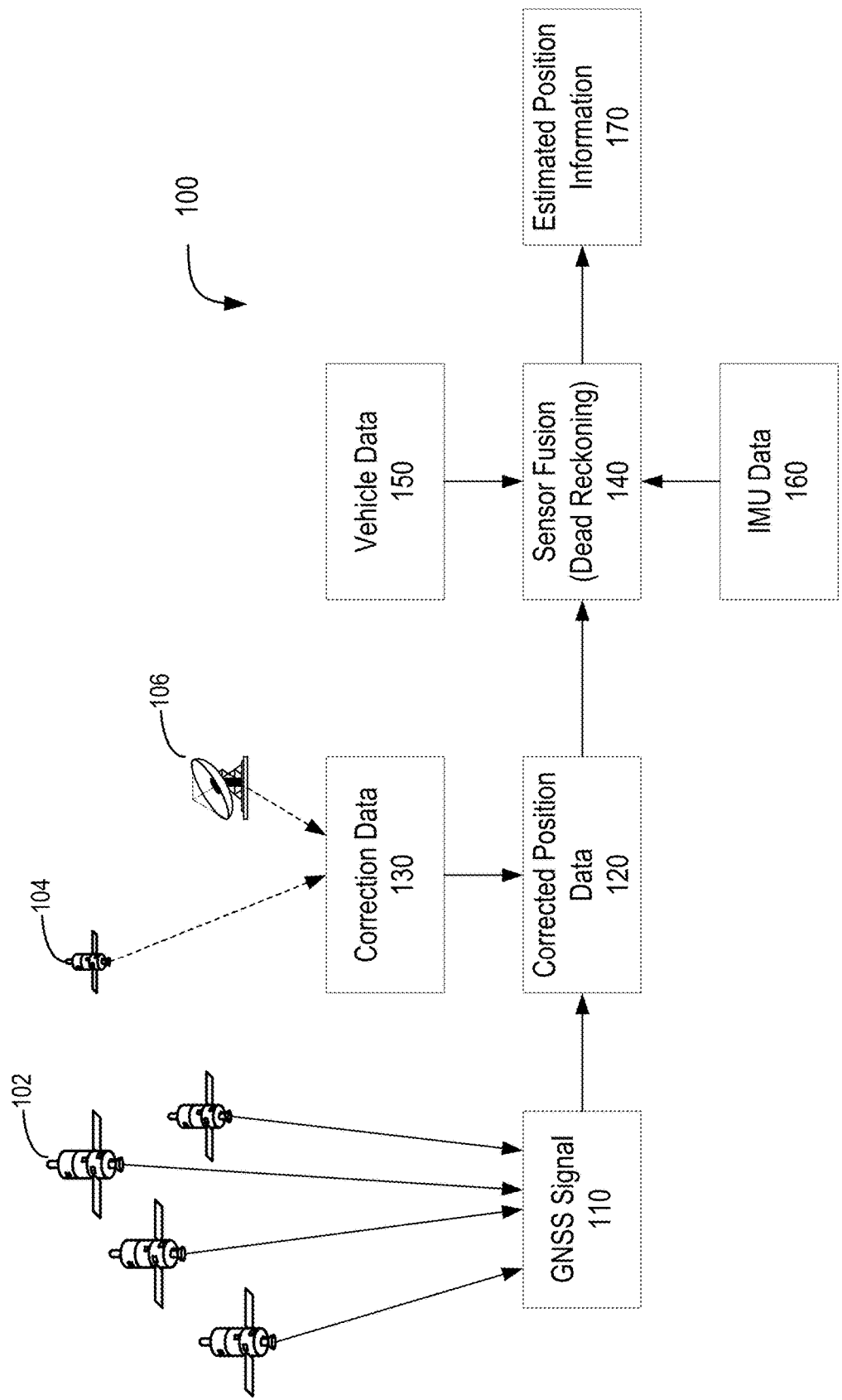
FIG. 1 illustrates an example of a Global Navigation Satellite System (GNSS) based positioning system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure. In the appended figures, similar components and/or features may have the same reference label.

DETAILED DESCRIPTION

This disclosure relates generally to Global Navigation Satellite System (GNSS) based positioning techniques. A GNSS-based positioning system generally reports position related information (often referred to as fix information), such as time, latitude, longitude, heading, and speed. The position related information may include various errors caused by, for example, multipath, satellites signal errors (e.g., orbit, clock, and atmospheric errors), and receiver errors. In many applications, error information (e.g., standard deviation and/or mean errors) of the estimated position related information may also be useful for drivers or automated vehicle control systems to determine whether they can confidently rely on the estimated position information in safety critical automotive applications, such as automated driving. However, a GNSS-based positioning system may not know its true position in real time in order to calculate the error of the estimated position. Although some high precision differential GNSS receivers can deliver centimeter level accuracy under certain ideal conditions, such as open sky, their reliability may not be guaranteed at all time. For example, some GNSS receivers may report overly optimistic estimated values of errors when the environmental conditions are not ideal. In addition, many GNSS-based positioning systems do not report their integrity performance in real time.

According to certain embodiments, position related information reported by a GNSS-based positioning system during a trip of a vehicle on a route may be collected and post-processed to determine more accurate position information, which may then be used to determine more accurate errors and integrity information of the position related information reported by the GNSS-based positioning system. The errors and integrity information may be used in future trips to more accurately report real-time integrity performance of the positioning system. For example, in some embodiments, the post-processed data, such as the errors and integrity information at various points on the route, may be used to generate a GNSS integrity map that includes a measure of trust of the GNSS-based positioning system at different geographical locations. The GNSS integrity map may be used by the GNSS-based positioning system on the vehicle or on other vehicles to more accurately estimate and report integrity information in real time in future trips.

As used herein, the term "integrity" refers generally to a measure of trust that can be placed in the correctness of the information supplied by a navigation system. The integrity of a GNSS-based positioning system may include the ability of the system to provide timely warnings to users when the GNSS-based positioning system should not be used for navigation. The integrity of a system may be described using, for example, alert limit (AL), integrity risk (IR), protection level (PL), and time to alert (TTA).

As used herein, the term "alert limit" (AL) for a given parameter measurement refers generally to the error limit not to be exceeded without issuing an alert. In other words, an alert would be issued if the error exceeds the alert limit. In a positioning system, the horizontal (or vertical) alert limit is the maximum allowable horizontal (or vertical) position error beyond which the system should be declared unavailable for the intended application.

As used herein, the term "integrity risk" (IR) refers generally to a probability that, at any moment, the position error exceeds the alert limit.

As used herein, the term "time to alert" (TTA) refers generally to the maximum allowable time elapsed from the onset of the navigation system being out of limit until the equipment enunciates the alert. When an integrity event occurs, an alarm should be raised within the TTA after the event.

As used herein, the term "protection level" (PL) refers generally to a statistical error bound computed so as to guarantee that the probability of the absolute position error exceeding the error bound is smaller than or equal to a target IR. A horizontal protection level is a bound on the horizontal position error with a probability derived from the integrity requirement (e.g., integrity risk). Similarly, a vertical protection level is a bound on the vertical position error with a probability derived from the integrity requirement (e.g., integrity risk). For example, it is desirable that the probability that the absolute position error is below the protection level is a number very close to 1, such as 99.9999% or larger.

In the following description, several illustrative embodiments will be described with respect to the accompanying drawings. The embodiments described herein may include devices, modules, methods, systems, and non-transitory computer-readable storage media storing instructions executable by one or more processors of a computer system. While particular embodiments, in which one or more aspects of the disclosure may be implemented, are described below, other embodiments may also be used and various modifications may be made without departing from the scope of the disclosure or the spirit of the appended claims. For the purposes of explanation, specific details are set forth in the figures and the description in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Different sensors, such as an ultrasonic sensor, a motion sensor, a radar sensor, a wheel sensor, a GNSS receiver, and the like, can be used to determine local or relative location of a vehicle. For example, a GNSS receiver may be used to determine the absolute location of a vehicle. The GNSS receiver may include, for example, a receiver that can receive broadcast signals from GNSS satellites, such as satellites for the Global Position System (GPS, United States), Galileo (European Union), Glonass (Russia), BeiDou (China), or the like. The GNSS receiver may determine the absolute position and velocity of the vehicle by processing the signals broadcasted by satellites. Because the satellites are always in motion, the GNSS receiver may continuously acquire and track the signals from the satellites in view, and compute its distance to a set of satellites based on the speed of the electromagnetic wave (e.g., speed of light), and the propagation time (e.g., time-of-flight) of the incoming signals travelling through space that may be determined using the satellite and receiver local clocks. The calculated distance may be a rough estimate of the true range between satellite and the vehicle, and may need to be corrected to account for various errors to determine a precise measurement of the true distance as described in more detail below. For example, the GNSS receiver may use various augmentation systems (e.g., a Satellite Based Augmentation System (SBAS)) that may be associated with or otherwise enabled for use with one or more global and/or regional navigation satellite systems to determine a more accurate location of the vehicle.

FIG. 1 illustrates a functional block diagram of an example of a GNSS-based positioning system 100 in a vehicle according to certain embodiments. A GNSS-based positioning system in a vehicle may include a GNSS receiver (e.g., satellite positioning system (SPS) receiver 780 in FIG. 7), an inertial measurement unit (IMU) or other sensors, and a processor that uses a dead reckoning (DR) algorithm to fuse the data from the GNSS receiver and the IMU or other sensors.

The GNSS receiver receives GNSS signals broadcasted by GNSS satellites 102 that include range information and navigation data. The GNSS signals are modulated on carrier frequencies that are in the range of 1.2 to 1.5 GHz. One of the main GNSS signals is GPS L1 that contains a navigation message for each GPS satellites, a coarse acquisition (C/A) code that is freely available to the public, and an encrypted precision (P) code or P(Y) code (restricted access). The navigation message includes satellite status and health, satellite ephemeris data (which allows the receiver to calculate the satellite's position), and almanac that includes information and status (e.g., coarse orbit and status information).

GNSS receivers using code-based techniques may correlate or align with the pseudorandom noise (PRN) codes broadcasted by satellites to determine their time and position. The positioning accuracies of these code-based GNSS receivers may be about a few meters. To achieve a better accuracy, some GNSS receivers may use carrier-based techniques, such as Real Time Kinematic (RTK) and Precise Point Positioning (PPP) techniques, that measure the phase of the carrier wave. Because the carrier wave for the GNSS signal is a sine wave with a period of less than one meter (e.g., about 19 cm for L1 carrier signal), a more precise measurement of the time of flight may be achieved using the carrier-based techniques.

There may be several errors associated with a GNSS-based position system. For example, the atomic clocks in the GNSS satellites are very accurate, but they may still drift a small amount, and thus may cause an error of, for example, about ±2 meters. The satellite orbit may also vary a small amount, and thus may cause an error of, for example, about ±2.5 meters. To obtain a more accurate position, the GNSS receiver may need to compensate for the clock error and the orbit error of a satellite by, for example, downloading correction data 130 from, for example, an SBAS or PPP service satellite 104 or a differential GNSS or RTK base station 106.

In a differential GNSS system, the position of a fixed GNSS receiver (referred to as a base station) may be determined to a high degree of accuracy, and the base station may compare the known high accuracy position to the position calculated using GNSS signals. Differences between the two positions can be attributed to satellite ephemeris and clock errors, and errors associated with atmospheric delay. The base station may send these calculated errors to other GNSS receivers (e.g., rovers or vehicle-borne GNSS receivers), which may use the calculated errors to make corrections to the position calculations. The RTK technique also removes errors common to a base station and a rover. In addition, the RTK technique uses carrier-based ranging to achieve a better accuracy.

Some of the GNSS signals transmitted by the satellites may be reflected on the way to the GNSS receiver, such as by a building. This phenomenon is referred to as a multipath propagation. The reflected signals travel longer distances and thus are delayed from the direct signals, and may interfere with the direct signals if the reflected signals are sufficiently strong. The delayed signals can cause the receiver to calculate an incorrect position. Multipath errors may be difficult to handle because they are generally local errors that may not be similarly experienced by base stations. Techniques have been developed where the receiver may only consider the earliest-arriving signals and ignore the multipath signals that arrive later. In some cases, expensive high-end GNSS receivers and antennas may be needed to reduce long-delay multipath errors and short-delay multipath errors. High-end GNSS receivers may also have lower receiver noise caused by the hardware and software of the GNSS receivers.

Although high precision differential GNSS receivers can achieve centimeter level accuracy during significant percentage of the operation time (especially if under open sky), their reliability may not be guaranteed at all time. For example, in some ambient environments, there may be many obstacles, such as tall buildings, such that multipath errors may be high. In some ambient environments, the GNSS signals may be weak or unavailable when the satellites are not in the line-of-sight of the GNSS antenna, such as when a vehicle is under a bridge, or in a tunnel.

In some embodiments, vehicle data 150, such as wheel ticks, forward/reverse signals, steering wheel angles, and other data generated by the sensors in the vehicle, may be utilized to augment the GNSS-based position system, especially during GNSS signal outage or weakness. For example, a sensor fusion module 140 of a vehicle may, for example, use a dead reckoning (DR) technique to fuse IMU data 160, vehicle data 150, or other sensor data, and previously determined location of a vehicle (e.g., corrected position data 120) to estimate position information 170 of the vehicle when the GNSS signal is weak or unavailable. IMU data 160 may include the one or multi axes acceleration and angular rate information of the vehicle, measured by the IMU device. These measurements may be used to estimate speed, travelled distance, or change in angle of the vehicle during a time interval, such as about 100 msec.

Dead reckoning is a process of calculating a current position information by using a previously determined position (or fix) information, and advancing that position based upon known or estimated speed or change in angle over elapsed time and course. Many GNSS based positioning systems include certain DR implementations. Satellite signals may be unavailable in parking garages and tunnels, and are often severely degraded in urban canyons and near trees due to blocked lines of sight to the satellites or multipath propagation. In a dead-reckoning navigation system, the vehicle may be equipped with, for example, sensors that know the wheel circumference and record wheel rotations and steering direction. These sensors are often already present in vehicles for other purposes (e.g., anti-lock braking system, electronic stability control, etc.) and can be read by the navigation system from the controller-area network (CAN) bus. The navigation system then uses, for example, an extended Kalman filter (or a variation of it, such as unscented Kalman filter, particle filter, and the like) to integrate the always-available sensor data with the more accurate but occasionally unavailable position information from the GNSS receiver into a combined position fix. Dead reckoning algorithm is also often used to estimate and provide vehicle position information at a higher update rate than what the GNSS receiver can handle, such as 20 Hz or higher. Most automotive-grade GNSS receivers only output the position information at 1 Hz or no more than 10 Hz. Another usage of dead reckoning is in more accurate estimation of vehicle position information during turns, in which the GNSS receiver may have a delay in estimating the velocity and heading angle.

In many applications, it may also be desirable that a GNSS receiver can accurately estimate error information associated with the determined position as part of estimated position information 170, such as the standard deviation of the error. A high precision differential GNSS receiver that can achieve centimeter level accuracy for position measurement during most of the operation time may sometimes report over-optimistic values of estimated error when the environmental conditions are not ideal. For example, a vehicle may be under a freeway overpass, on city streets surrounded by trees and buildings, in a tunnel, inside parking garage, and the like, or may quickly transition from one non-ideal environmental condition to another non-ideal environmental condition. The transitions may make it very difficult to accurately estimate the error, determine precise protection level, and output trustworthy position information. For example, a GNSS receiver may report that the standard deviation of the errors is 10 cm, while the actual standard deviation of the errors may be about 75 cm. Because of this issue, even high precision GNSS receivers may still not be suitable for use (as a key sensor) in safety-critical automotive applications, such as automated driving. High-precision GNSS receivers may be used in other safety-critical applications, such as navigating ships or airplanes, because, in such applications, the environment is almost always open sky, hence zero to negligible multipath.

As mentioned before, in some embodiments, estimated position information 170 may be computed using a Kalman filter. A Kalman filter may perform a recursive two-stage process that includes a prediction stage and an update or correction stage. The prediction stage may make estimations of the current state and uncertainties by projecting forward the prior state and uncertainties to obtain an a priori estimation of the current state and uncertainties, and the update stage may make an update to the a priori estimation based on the current measurement to obtain an improved a posteriori estimation.

Figure 2:
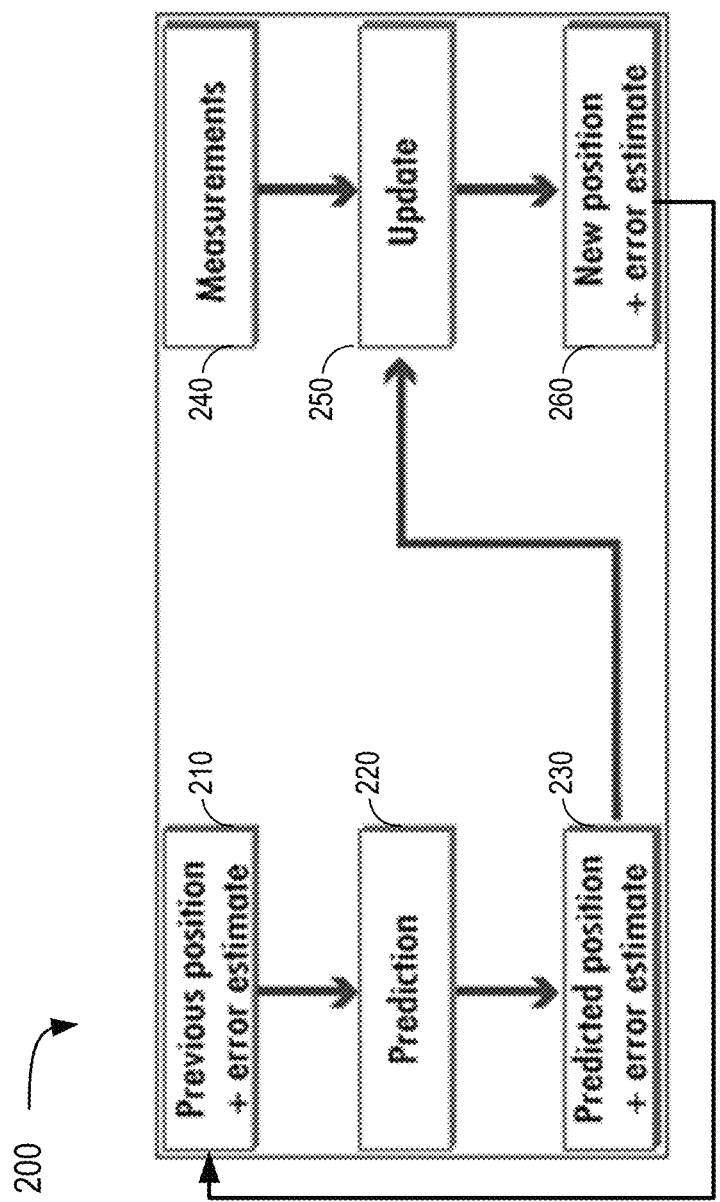
FIG. 2 is a simplified block diagram of an example of a Kalman filter for estimating position and error information in a GNSS-based positioning system according to certain embodiments.

FIG. 2 is a simplified block diagram illustrating an example of a Kalman filter 200 for estimating position and error information in a GNSS-based positioning system according to certain embodiments. Kalman filter 200 may also be used for sensor fusion for position and tracking approximation. For example, a prediction engine 220 of Kalman filter 200 may use previous position and error estimate 210 (e.g., a prior state) to predict the current position and error estimate (e.g., a current state) based on a system model. The predicted position and error estimate 230 (e.g., a priori estimation) of the current state may be fed to an update engine 250. Update engine 250 may also receive one or more measurements 240 from one or more sensors (e.g., a GNSS receiver, radar, LIDAR, camera, and the like), where each measurement may include some measurement errors. Update engine 250 may determine a new position and error estimate 260 (e.g., a posteriori estimation) of the current state based on the predicted position and error estimate 230 of the current state and one or more measurements 240. For example, if the measurement error is large, the predicted position and error estimate 230 may have a higher weight on new position and error estimate 260 than the weight of measurements 240 on new position and error estimate 260. New position and error estimate 260 may then be used as the previous position and error estimate 210 in the next iteration.

In a GNSS-based positioning system, update engine 250 may use, for example, code and/or carrier phase measurements of visible and tracked GNSS satellites, and/or data from other vehicle sensors (e.g., IMU, radar, LIDAR, camera, etc.) to make the update. As the vehicle moves, prediction engine 220 may make predictions of the position and error information, for example, multiple times per second. The sensor(s) may also take multiple measurements in each second. Between two consecutive predictions, update engine 250 may use the measurements from the sensors to update the predictions of the position and error information.

Figure 3:
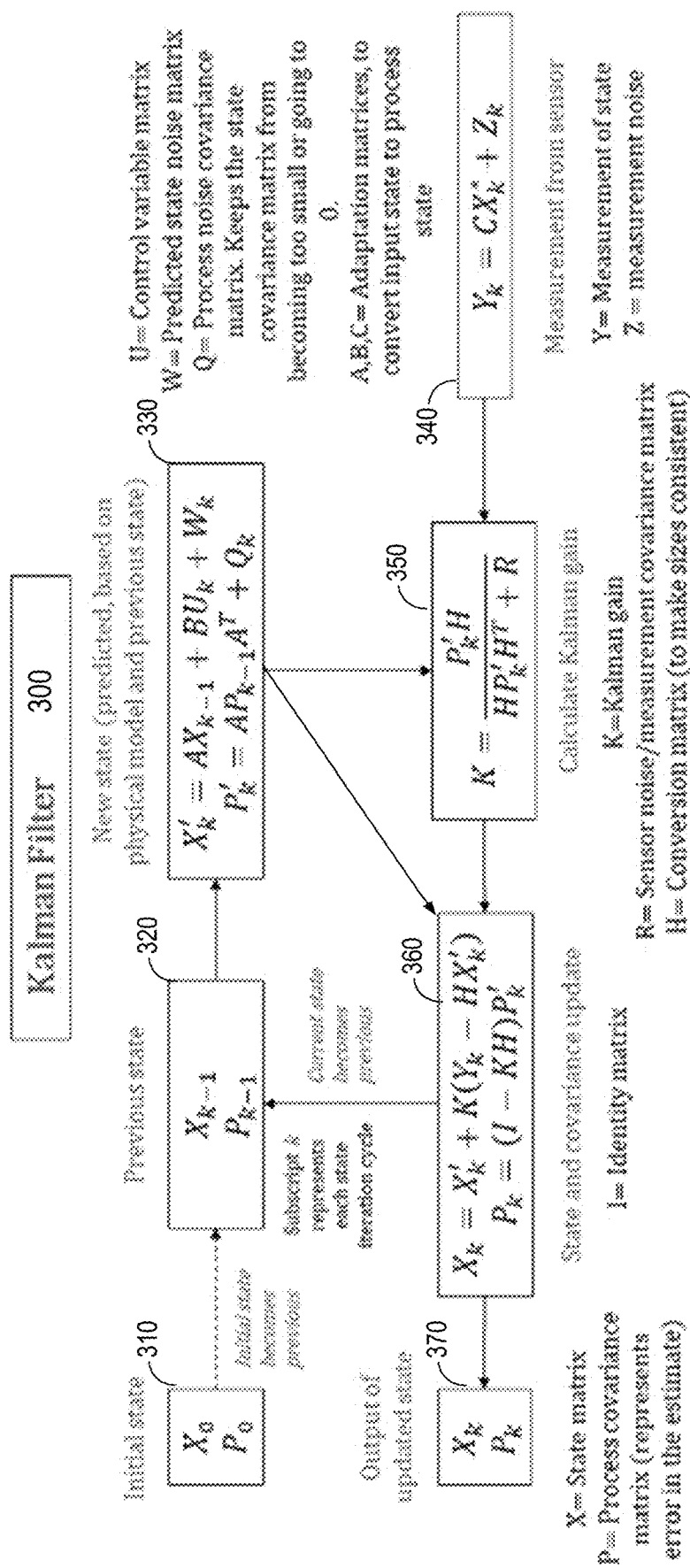
FIG. 3 illustrates detailed mathematical operations of an example of a Kalman filter for estimating position and error information in a GNSS-based positioning system according to certain embodiments.

FIG. 3 illustrates detailed mathematical operations of an example Kalman filter 300 for estimating position and error information in a GNSS-based positioning system according to certain embodiments. As described above, Kalman filter continuously predicts and updates the new values for a state vector X (e.g., position and velocity) and a covariance matrix (e.g., covariance matrix P) of the state vector, where the covariance matrix is related to the standard deviation of errors for each state element, such as latitude. A state measurement vector Y includes measurement results from one or more sensors, such as a GNSS receiver, IMU, LIDAR, and Radar. The measurement vector Y may include measurement noise Z, which may be modeled by a measurement covariance matrix R that includes covariance of, for example, GNSS measurement errors.

An initial state 310 of Kalman filter 300 may include an initial state vector $X_0$ and an initial covariance matrix $P_0$ of initial state vector $X_0$. Initial state 310 may be used as a previous state 320 (including a previous state vector $X_{k-1}$ and a previous covariance matrix $P_{k-1}$ of previous state vector $X_{k-1}$) to determine a predicted next state 330 (including a predicted next state vector $X'_k$ and a predicted next covariance matrix $P'_k$ of predicted next state vector $X'_k$) based on a physical model of a process or a system, such as a vehicle. A measured next state vector $Y_k$ (which may include measurement noises $Z_k$) generated from sensor measurements 340, measurement covariance matrix R, predicted next covariance matrix $P'_1$, and a conversion matrix H for converting predicted state vector X to predicted measurement vector Y may be used to determine a Kalman gain (K) 350. Updated next state estimate 360 (including an updated next state vector $X_k$ and a predicted next covariance matrix $P_k$ of predicted next state vector $X_k$) may be computed using Kalman gain (K) 350 and predicted next state 330. Updated next state estimate 360 can be sent or saved as output state 370 and can be used as a previous state 320 in the next iteration.

In FIG. 3, matrix U is a control variable matrix that includes control inputs. Matrix W is the predicted state noise matrix. Q may be the process noise covariance that contributes to the overall uncertainty. When Q is large, Kalman filter 300 may track large changes in the data more closely than for smaller Q. Measurement noise covariance R may determine how much information from the measurement should be used. If measurement noise covariance R is high, Kalman filter 300 may consider the measurements as not very accurate. For smaller measurement noise covariance R, Kalman filter 300 may follow the measurements more closely.

When multiple sensors, such as GNSS receivers, radars, LIDARs, and/or cameras, are used, the measurement vector Y may include the fused measurement results from the multiple sensors, and conversion matrix C or H may have a corresponding size to make the dimension of measurement vector Y consistent with the dimension of vector (C×X) or (H×X). In some embodiments, the sensors may have different accuracies. Leveraging the capabilities and strengths of each sensor through sensor fusion may make the positioning system more robust for automated driving.

As described above, in many applications, it may be desirable that a GNSS receiver can accurately estimate error information associated with the determined position, such as the standard deviation of the error, as part of the estimated position information. For example, in automated driving applications, in addition to the accuracy, high integrity (trust) in the position information may also be needed. Many GNSS receivers do not report integrity information because the integrity information may not be needed for applications such as road level navigation, and, at meter level accuracy, the PL may be about 10 meters or larger and thus may not be very useful for automated driving.

A GNSS-based positioning system may be considered "unavailable" when the protection level is greater than the alert limit. A misleading information (MI) event may occur when the system is declared available and the position error exceeds the protection level but not the alert limit. A hazardously misleading information (HMI) event occurs when the system is declared available but the position error exceeds the alert limit. For example, it may be hazardous when the positioning system reports that its estimated error (e.g., PL) is 15 cm, while the actual position error (PE) is 95 cm and the alert limit (AL) has been set to 30 cm. The MI and HMI probabilities depend on the actual position error and the determined protection level. In one example, Stanford integrity diagrams (or simply Stanford diagrams) may be used to determine the operation mode of a GNSS-based positioning system, such as normal operations, unavailability, MI events, and HMI events.

Figure 4:
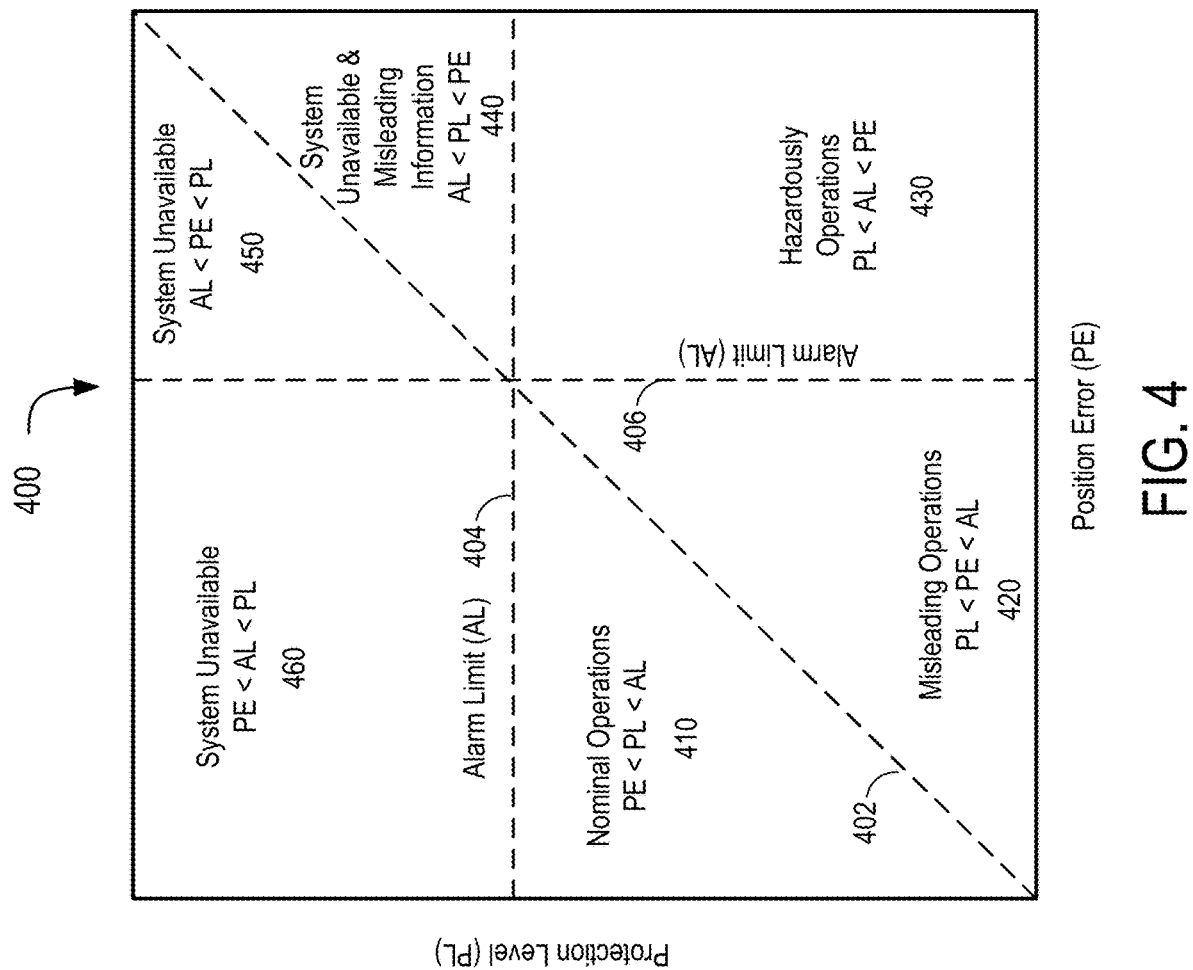
FIG. 4 illustrates an example of a Stanford integrity diagram for presenting integrity information of a GNSS-based positioning system according to certain embodiments.

FIG. 4 illustrates an example of a Stanford integrity diagram 400 for presenting integrity information of a GNSS-based positioning system according to certain embodiments. Stanford integrity diagram 400 may represent either the horizontal position error (HPE) and the corresponding horizontal protection level (HPL), or the vertical position error (VPE) and the corresponding vertical protection level (VPL). In Stanford integrity diagram 400, the x-coordinate (abscissa) of a point represents the absolute position error of a sample, and the y-coordinate (ordinate) represents the associated protection level. A diagonal 402 separates samples above diagonal 402 (for which the position error is covered by (lower than) the protection level) from samples below diagonal 402 (for which the position error exceeds the protection level). A horizontal line 404 and a vertical line 406 may represent the alert limit.

In Stanford integrity diagram 400, sample points in a triangle 410 may have position errors lower than the corresponding protection levels, which may be lower than the alert level. Thus, sample points in triangle 410 may indicate normal operations or correct system performance (in terms of availability and integrity). In a triangle 420, the sample points may have position errors less than the alert limit but greater than the corresponding protection levels. The sample points in triangle 420 may represent MI events. The sample points in a rectangle 430 may represent HMI events that may have position errors greater than the alert level, which is greater than the respective protection levels. In a triangle 440, the sample points may have position errors greater than the corresponding protection levels, which are greater than the alert limit. These sample points in triangle 440 may represent system unavailability and MI events. Sample points in a triangle 450 and a rectangle 460 may represent system unavailability because the protection levels are higher than the alert limit.

Stanford integrity diagram 400 may allow an easy and quick check of the integrity of a system by checking the locations of the sample points with respect to diagonal 402. In addition, the proximity of the cloud of sample points to diagonal 402 may indicate the level of safety, because any point above diagonal 402 but very close to it indicates that an integrity event was close to occur.

As described above, the MI and HMI probabilities depend on the actual position error and the determined protection level. However, the actual position error and the determined protection level may be difficult to obtain in real time based only on real-time measured data because a GNSS-based positioning system may not know the actual positions of the vehicle accurately during a trip. This may be due to the high cost and large size of high precision GNSS receivers and the limited availability of the correction data (e.g., from ground based GNSS base stations).

Most vehicles, such as privately owned vehicles, may repeatedly run on the same roads. For example, a person driving to work may take the same route every day. According to certain embodiments, the position information from a trip may be recorded, and techniques for post processing the recorded position information from the trip may be used to determine the accurate positions of the vehicle during the trip and thus the true performance of the vehicle's positioning system. The results of the post processing may be used by the vehicle for the next trip to have a more accurate interpretation of its positioning system performance, in terms of accuracy and error bound, in real time. Performance of GNSS based positioning systems, in particular, high precision systems, depends to a great extent on the environmental conditions. In places where GNSS signals from one or more satellites are blocked or reflected by objects near the vehicle, error of the system generally increases. These objects could be buildings, trees, hill, overpass, and so on. Exact impact of these obstructions on the end accuracy of the system may be difficult to model. One way to estimate this impact is using empirical data, as described in this disclosure.

In one embodiment, results of the post processing may also be shared among vehicles. For example, a vehicle manufacturer may share the post processed information regarding certain routes among its vehicles, such that post processed data from a trip by one vehicle may be used by another vehicle driving on the same route at a later time to have a more accurate sense of its positioning system performance in real time.

Figure 5:
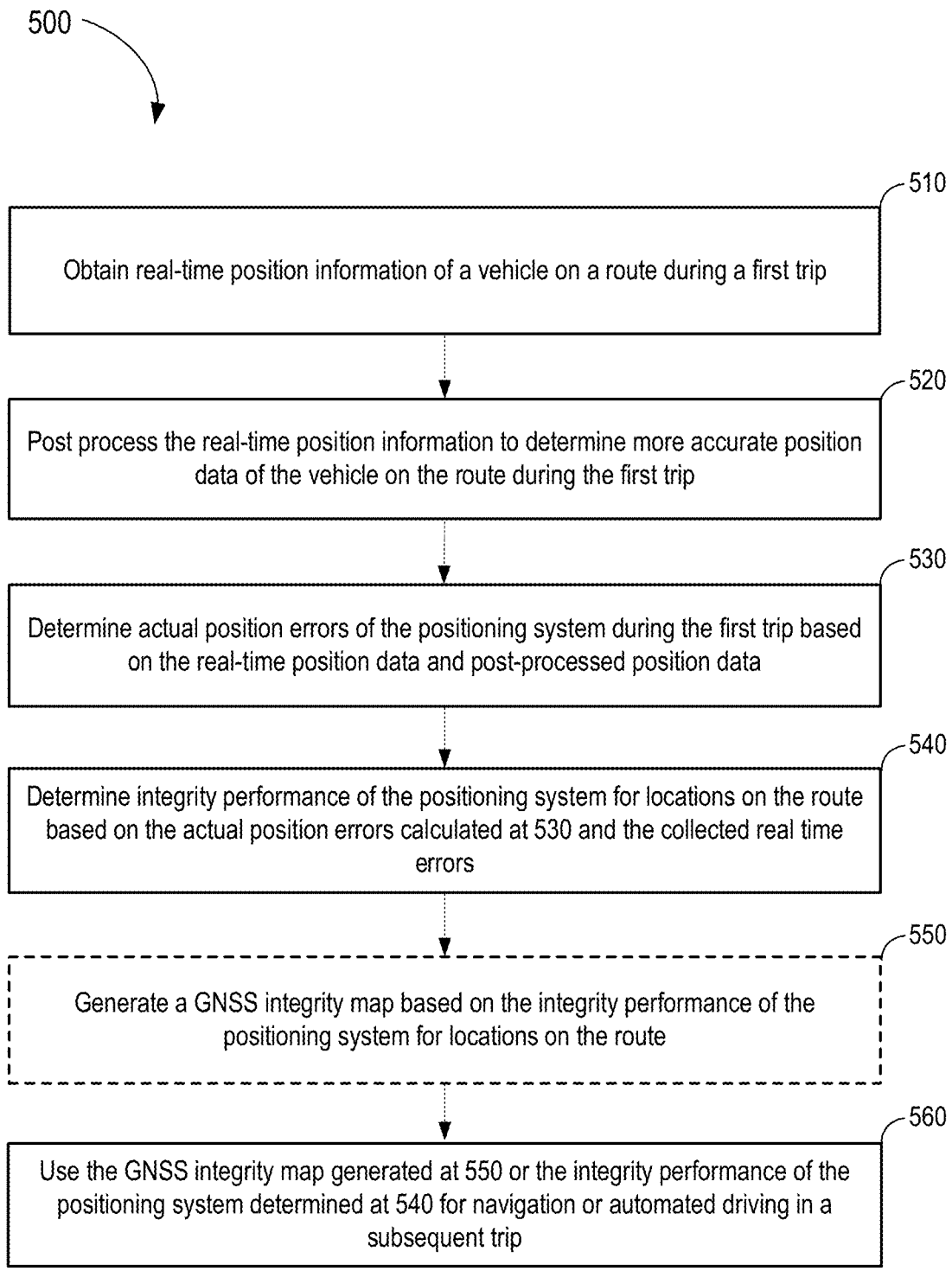
FIG. 5 is a flow chart illustrating an example of a method for accurately determining position and integrity information in a GNSS-based positioning system according to certain embodiments.

FIG. 5 is a simplified flow chart illustrating an example of a method for accurately estimating position and error information in a GNSS-based positioning system according to certain embodiments. The processing presented in FIG. 5 and described below is intended to be illustrative and non-limiting. Although FIG. 5 depicts the various operations occurring in a particular sequence or order, this is not intended to be limiting. In certain alternative embodiments, the operations may be performed in some different order or some operations may also be performed in parallel. Furthermore, embodiments of the method may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. One or more processors may perform the associated tasks.

At 510, a GNSS-based positioning system on a first vehicle driving between an origin and destination of a route may record or report position related information of the vehicle periodically, such as at about 10 Hz. The position related information may include raw and processed GNSS satellites signals, vehicle and IMU data, GNSS correction data, and so on. The route may include a mix of freeways, city streets, tunnels, and the like. In some embodiments, the position information recorded or reported may include the estimated position errors and other outputs or states (e.g., velocity) of the vehicles determined by the GNSS-based positioning system (e.g., sensor fusion module 140) at different times (and geographic locations) as described above. The GNSS-based positioning system may report the position information of the vehicle, for example, to a remote computer system or a server through a network, or store it in a local memory of the vehicle.

At 520, a computer system, such as a remote computer system or a vehicle control system, may remotely or locally post process the position information collected by the first vehicle during the first trip. The post processing can use techniques, such as differential GNSS, RTK, SBAS, PPP, or the like as described above, on the GNSS measurements collected during the trip. During post-processing, GNSS correction data from one or more GNSS base stations may be used. The post processing may more accurately determine the route taken by the vehicle and states of the vehicle during the trip (e.g., horizontal and vertical components of the position and/or velocity). Examples of post processing techniques may include open source RTKPOST (applicable when RTK technique is used), GrafNav, and CenterPoint RTX. During post processing, various smoothing techniques may be used. One technique is two-pass smoother, also referred to as Rauch-Tung-Striebel (RTS) smoother, where the standard Kalman estimate and covariance are computed in a forward pass, and the smoothed quantities are then computed in a backward pass. RTS is an efficient two-pass algorithm for fixed interval smoothing. The forward pass is the same as the regular Kalman filter algorithm. These filtered a-priori (i.e., prior to update stage of the filter) and a-posteriori (i.e., after update stage of the filter) state estimates $\hat{x}_{\bar{k}}$, $\hat{x}_k$ and covariance values $P_{\bar{k}}$, $P_k$ (see, e.g., FIG. 3) are saved for use in the backwards pass. In the backwards pass, smoothed state estimates $\hat{x}_{5|n}$, and $P_{k|n}$ are computed, where 'n' is the total number of observations for the entire trip or a section of the trip that is being post-processed. The backward estimator starts at the last time step and proceeds backwards in time using the following recursive equations:

$$\hat{x}_{k|n} = \hat{x}_{k|k} + C_k(\hat{x}_{k+1|n} - \hat{x}_{k+1|k}), \text{ and}$$

$$P_{k|n} = P_{k|k} + C_k(P_{k+1|n} - P_{k+1|k})C_k^T,$$

where $C_k = P_{k|k} A_{k+1}^T P_{k+1|k}^{-1}$.

Post processing of the position information collected during the first trip by the vehicle may result in much more accurate position data, and high confidence on the validity of the position data. For example, if the post processed position data for time instant t indicates that the position error was 15 cm, it is almost certain that the position error would not exceed 15 cm. Thus, the post processed position data can be treated as semi-truth of the actual positions and can be used for calculating actual errors of the collected real-time data.

At 530, a difference between the post processed position data (as the semi-truth) and the collected real-time position data is calculated for each time instant (or geographic location). The difference may represent the actual position errors of the GNSS-based positioning system for the first trip.

At 540, the actual position errors calculated at 530 and the collected real-time errors (e.g., estimated position errors determined by the positioning system in real time during the first trip) may be compared with each other to derive a measure of trust (e.g., integrity) for each location. Since the probability of HMI is generally very low, it is not practical to determine the HMI probability by dividing the number of HMI events by the total number of measured samples because very few HMI events may occur during some example trips. Various techniques may be used to derive the integrity information for each location from the measurement data. For example, a generalized extreme value statistical method described in H. Kannemans, "*The Generalized Extreme Value Statistical Method to Determine the GNSS Integrity Performance*," National Aerospace Laboratory NLR, Report No. NLR-TP-2010-491 (December 2010), which is herein incorporated by reference, may be used to determine the probability of HMI based on the measured probability distribution function of the protection level and an extreme value (e.g., block maxima) probability function related to the position error. To accurately determine the probability of HMI, the tail of the two probability distribution functions may need to be fitted within a sufficiently high degree of accuracy because the probabilities of MI events and HMI events depend heavily on the probability distribution in the tail region. The generalized extreme value statistical method analyzes tail distribution of the errors, where the tail of the distribution represents larger errors. The generalized extreme value statistical method takes into account the fact that the probability distribution function of the GNSS-based positioning system is generally not a known probability function, such as Gaussian or Rayleigh distribution, due to, for example, biases resulting mostly from the multipath errors.

Optionally, at 550, from the integrity performance of the positioning system determined at 540, a GNSS integrity map may be created for locations on the route. The GNSS integrity map may include the integrity information for different locations, such as the actual position error and the protection level for each of multiple locations on the route. The GNSS integrity map may also include integrity performance of similar positioning systems at other locations determined from other trips and/or other routes. The GNSS integrity map may become more and more accurate as data from more and more trips are analyzed and incorporated into the GNSS integrity map to determine the integrity performance of GNSS-based positioning systems at different geographic locations.

At 560, during a subsequent trip, a vehicle's positioning system may use the integrity map generated at 550 or the integrity performance of the positioning system determined at 540 for integrity performance reporting that may then be used by navigation or automated driving or other systems. For example, based on the integrity performance near certain locations, such as tunnels or city streets, the positioning system may provide early alerts or reports of unavailability of the positioning system, because the previously estimated protection levels may be too large (e.g., 5.1 meters versus normally sub-meters) at these locations. In some embodiments, the vehicle's positioning system may also use the GNSS integrity map or the integrity performance determined based on previous trip(s) to determine and output more accurate integrity information, such as statistics of position error and protection level, in real time during the subsequent trip. The statistics may include confidence intervals of the position error at different percentage levels, such as 68%, 95%, and 99%.

Figure 6:
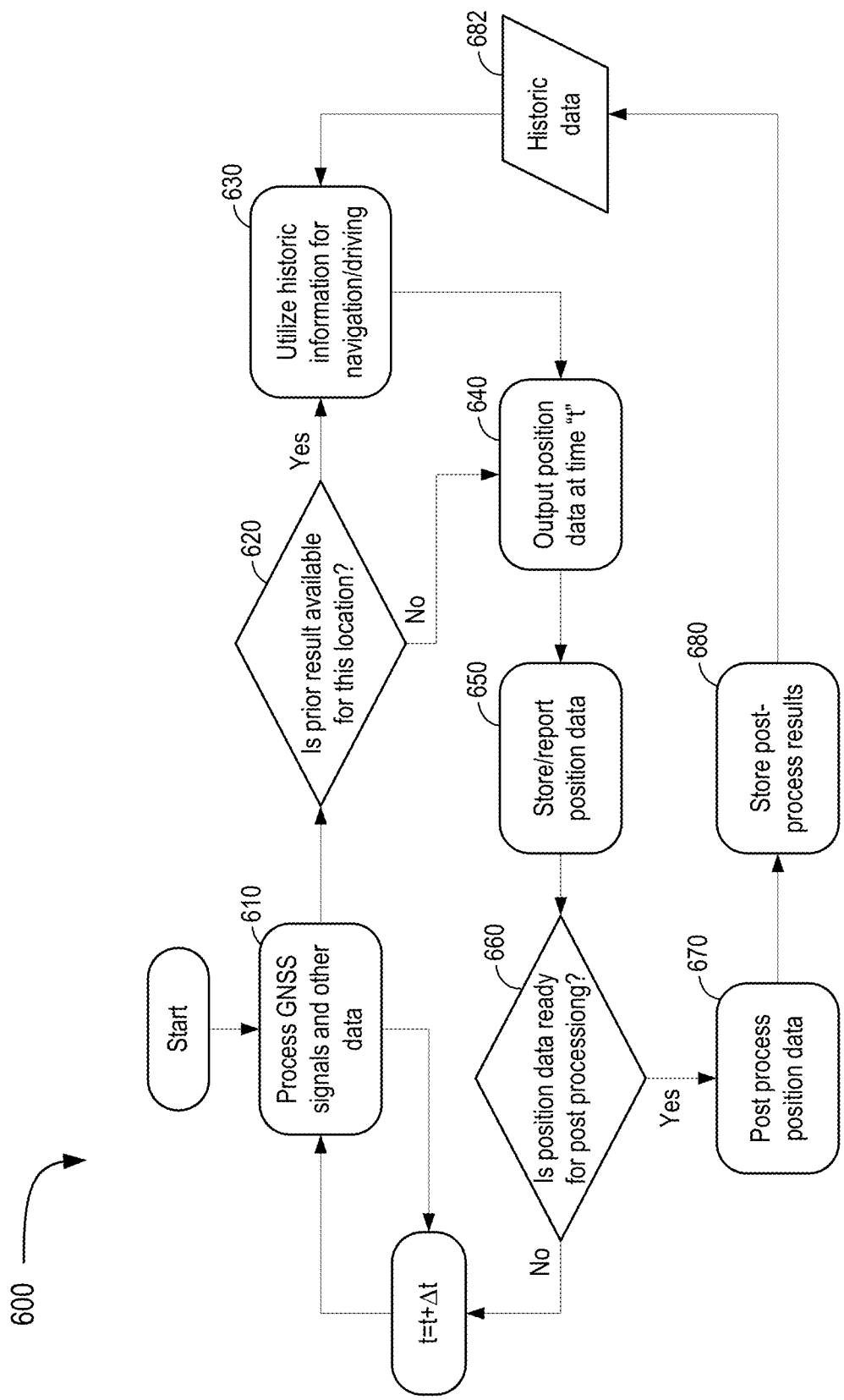
FIG. 6 is a simplified flow chart illustrating an example of a method for accurately estimating position and error information in a GNSS-based positioning system according to certain embodiments.

FIG. 6 is a simplified flow chart 600 illustrating an example of a method for accurately estimating position and error information in a GNSS-based positioning system according to certain embodiments. The method described in flow chart 600 may be performed by one or more vehicles and/or one or more remote computer systems.

Flow chart 600 may start at a first time instant, such as $t=t_0$, during a trip by a vehicle. At 610, a positioning system on the vehicle may receive and process GNSS signals and/or data from other sensors (e.g., IMU) to determine position data of the vehicle at time instant t by, using a sensor fusion module as described above. At 620, the positioning system may determine if prior positioning results (e.g., integrity information) from prior trips are available for the current location based on, for example, a GNSS integrity map as described above. If prior positioning results (e.g., integrity information, such as the position error and/or the protection level) are available for the current location, the positioning system may use the prior positioning results at 630 for integrity performance reporting, as described above with respect to 560 of flow chart 500. If the prior positioning results are not available (e.g., the trip is the first trip on a route by a vehicle that collects or reports real-time position information), the positioning system may only output the position data of the vehicle, i.e. without the integrity performance reporting utilizing the historical data, at time t at 640. The output position data may be stored locally or reported to a remote computer system at 650.

If the position data is not ready for post processing at 660, the positioning system may continue to receive and process GNSS signals and/or other sensor data at a next time instant $t+\Delta t$ and store or report the position data as described above with respect to 610-650. If the position data is ready for post processing at 660, such as after the trip or after a significant portion of the trip, the position data may be post processed at 670 locally or at the remote computer system as described above with respect to, for example, 520-540 of flow chart 500. The post-process results may then be stored as historic data 682 at 680. The historic data may include, for example, a GNSS integrity map as described above, and may be used by the same vehicle or a different vehicle in a subsequent trip.

Figure 7:
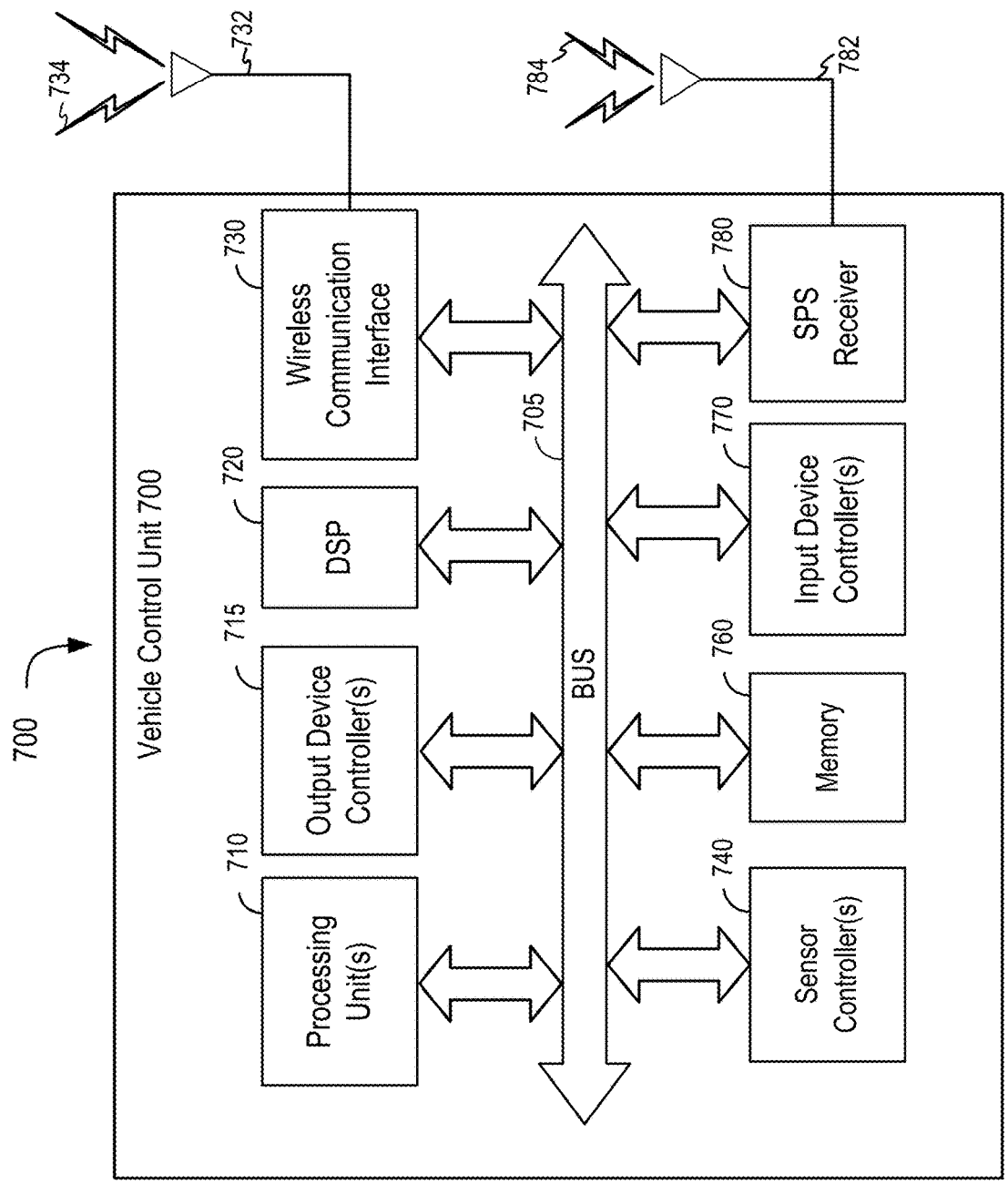
FIG. 7 is a simplified block diagram of an example of a vehicle control unit for implementing one or more embodiments.

FIG. 7 is a simplified block diagram of a vehicle control unit 700 usable for implementing one or more embodiments. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations.

The vehicle control unit 700 is shown comprising hardware elements that can be electrically coupled via a bus 705 such as a CAN bus (or may otherwise be in communication, as appropriate). The hardware elements may include a processing unit(s) 710 which can include without limitation one or more general-purpose processors, one or more special-purpose processors (such as digital signal processing (DSP) chips, graphics acceleration processors, application specific integrated circuits (ASICs), and/or the like), and/or other processing structure or means. Some embodiments may have a separate DSP 720, depending on desired functionality. The vehicle control unit 700 also can include one or more input device controllers 770, which can control without limitation an in-vehicle touch screen, a touch pad, microphone, button(s), dial(s), switch(es), and/or the like; and one or more output device controllers 715, which can control without limitation a display, light emitting diode (LED), speakers, and/or the like.

The vehicle control unit 700 may also include a wireless communication interface 730, which can include without limitation a modem, a network card, an infrared communication device, a wireless communication device, and/or a chipset (such as a Bluetooth device, an IEEE 802.11 device, an IEEE 802.16 device, a Wi-Fi device, a WiMax device, cellular communication facilities including 4G, 5G, etc.), and/or the like. The wireless communication interface 730 may permit data to be exchanged with a network, wireless access points, other computer systems, and/or any other electronic devices described herein. The communication can be carried out via one or more wireless communication antenna(s) 732 that send and/or receive wireless signals 734.

Depending on desired functionality, the wireless communication interface 730 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The vehicle control unit 700 can further include sensor controller(s) 740. Such controllers can control, without limitation, one or more accelerometer(s), gyroscope(s), camera(s), RADAR sensor(s), LIDAR sensor(s), ultrasonic sensor(s), magnetometer(s), altimeter(s), microphone(s), proximity sensor(s), light sensor(s), and the like.

The vehicle control unit 700 may further include and/or be in communication with a memory 760. The memory 760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 760 of the vehicle control unit 700 can also comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently.

In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method performed by one or more processors of a computer system, the computer-implemented method comprising:

obtaining, by the computer system, collected position information of a first vehicle, the collected position information being determined by a first positioning system on the first vehicle and collected in real time during a first trip on a route, the collected position information including estimated positions of the first vehicle and corresponding estimated position errors at a plurality of locations on the route;

receiving, by the computer system, position correction data associated with the route;

post-processing, by the one or more processors and based on the position correction data, the collected position information to determine corrected position data of the first vehicle during the first trip;

computing, by the one or more processors and based on the estimated positions of the first vehicle and the corrected position data, corrected position errors of the first positioning system at the plurality of locations during the first trip;

determining, by the one or more processors and based on the corrected position errors and the estimated position errors, an integrity performance of the first positioning system at the plurality of locations; and providing, by the computer system to the first vehicle or a second vehicle, the integrity performance of the first positioning system at the plurality of locations for determining, in real time and during a second trip on the route, a real-time integrity performance of the first positioning system on the first vehicle or a second positioning system on the second vehicle at the plurality of locations.

2. The computer-implemented method of claim 1, wherein the position correction data includes at least one of:
 differential Global Navigation Satellite System (GNSS) correction data;
 Real Time Kinematic (RTK) correction data;
 Satellite Based Augmentation System (SBAS) correction data; or
 Precise Point Positioning (PPP) correction data.

3. The computer-implemented method of claim 1, further comprising:
 generating, based at least in part on the integrity performance of the first positioning system at the plurality of locations on the route, an integrity map that includes the integrity performance for at least the plurality of locations on the route; and
 providing the integrity map to the first vehicle or the second vehicle.

4. The computer-implemented method of claim 3, wherein the first positioning system or the second positioning system reports, based on the integrity map, at least one of:
 unavailability of the first positioning system or the second positioning system;
 a misleading information event;
 a hazardous misleading information event; or
 an alert event.

5. The computer-implemented method of claim 1, wherein determining the integrity performance of the first positioning system at the plurality of locations on the route includes determining the integrity performance using a generalized extreme value statistical technique.

6. The computer-implemented method of claim 1, wherein the integrity performance includes at least one of:
 a protection level;
 an alert limit;
 integrity risk; or
 time to alert.

7. The computer-implemented method of claim 1, wherein the first positioning system includes a GNSS receiver.

8. The computer-implemented method of claim 7, wherein the first positioning system further includes:
 an inertial measurement unit (IMU); and
 a sensor fusion module for determining the collected position information based on outputs of the IMU and the GNSS receiver.

9. The computer-implemented method of claim 1, wherein the first positioning system includes a Kalman filter configured to determine the estimated positions of the first vehicle and the corresponding estimated position errors.

10. A positioning system for a vehicle, comprising:
 a Global Navigation Satellite System (GNSS) antenna configured to receive GNSS signals from GNSS satellites;
 one or more processors; and
 one or more computer-readable storage media storing instructions that, when executed by the one or more processors, cause the one or more processors to:
 receive the GNSS signals from the GNSS antenna;
 receive a GNSS integrity map that includes an integrity performance of one or more GNSS-based positioning systems at a plurality of geographical locations;
 determine, based on the GNSS signals and the GNSS integrity map, a real-time integrity performance of the positioning system during a trip; and
 report the real-time integrity performance of the positioning system.

11. The positioning system of claim 10, wherein the integrity performance includes at least one of:
 a protection level;
 an alert limit;
 integrity risk; or
 time to alert.

12. The positioning system of claim 10, wherein reporting the real-time integrity performance of the positioning system includes reporting at least one of:
 unavailability of the positioning system;
 a misleading information event;
 a hazardous misleading information event; or
 an alert event.

13. The positioning system of claim 10, wherein determining the real-time integrity performance of the positioning system comprises determining estimated positions of the vehicle and corresponding estimated position errors using a Kalman filter.

14. The positioning system of claim 13, wherein the instructions, when executed by the one or more processors, further cause the one or more processors to:
 receive position correction data including at least one of:
 differential Global Navigation Satellite System (GNSS) correction data;
 Real Time Kinematic (RTK) correction data;
 Satellite Based Augmentation System (SBAS) correction data; or
 Precise Point Positioning (PPP) correction data; and
 correct the estimated positions of the vehicle based on the position correction data.

15. The positioning system of claim 10, further comprising an inertial measurement unit (IMU), wherein the instructions, when executed by the one or more processors, further cause the one or more processors to implement a sensor fusion module that determines positions of the vehicle based on outputs of the IMU and the GNSS signals.

16. A computer-readable storage medium storing instructions that, when executed by one or more processors of a computer system, cause the one or more processors to perform:
 obtaining, by the computer system, collected position information of a first vehicle, the collected position information being determined by a first positioning system on the first vehicle and collected in real time during a first trip on a route, the collected position information including estimated positions of the first vehicle and corresponding estimated position errors at a plurality of locations on the route;
 receiving, by the computer system, position correction data associated with the route;
 post-processing, by the one or more processors and based on the position correction data, the collected position information to determine corrected position data of the first vehicle during the first trip;

computing, by the one or more processors and based on the estimated positions of the first vehicle and the corrected position data, corrected position errors of the first positioning system at the plurality of locations during the first trip;

determining, by the one or more processors and based on the corrected position errors and the estimated position errors, an integrity performance of the first positioning system at the plurality of locations; and providing, by the computer system to the first vehicle or a second vehicle, the integrity performance of the first positioning system at the plurality of locations for determining, in real time and during a second trip on the route, a real-time integrity performance of the first positioning system on the first vehicle or a second positioning system on the second vehicle at the plurality of locations.

17. The computer-readable storage medium of claim 16, wherein the instructions further cause the one or more processors to perform:

generating, based at least in part on the integrity performance of the first positioning system at the plurality of locations on the route, an integrity map that includes the integrity performance for at least the plurality of locations on the route; and providing the integrity map to the first vehicle or the second vehicle.

18. The computer-readable storage medium of claim 16, wherein the position correction data includes at least one of:
differential Global Navigation Satellite System (GNSS) correction data;
Real Time Kinematic (RTK) correction data;
Satellite Based Augmentation System (SBAS) correction data; or
Precise Point Positioning (PPP) correction data.

19. The computer-readable storage medium of claim 16, wherein determining the integrity performance of the first positioning system at the plurality of locations on the route includes determining the integrity performance using a generalized extreme value statistical technique.

20. The computer-readable storage medium of claim 16, wherein the integrity performance includes at least one of:
a protection level;
an alert limit;
integrity risk; or
time to alert.

* * * * *